(12) United States Patent
Namuduri et al.

(10) Patent No.: US 12,500,437 B2
(45) Date of Patent: Dec. 16, 2025

(54) DC FAST CHARGING USING CLOSED-LOOP CONTROL OF MULTI-FUNCTIONAL INVERTER-BASED BOOST CONVERTER

(71) Applicant: GM GLOBAL TECHNOLOGY OPERATIONS LLC, Detroit, MI (US)

(72) Inventors: Chandra S. Namuduri, Troy, MI (US); Rashmi Prasad, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 640 days.

(21) Appl. No.: 17/968,024

(22) Filed: Oct. 18, 2022

(65) Prior Publication Data

US 2024/0128782 A1   Apr. 18, 2024

(51) Int. Cl.
*H02J 7/00* (2006.01)
*B60L 53/63* (2019.01)
*B60L 58/10* (2019.01)
*H02J 7/34* (2006.01)
*H02M 3/158* (2006.01)

(52) U.S. Cl.
CPC ........ *H02J 7/007182* (2020.01); *B60L 53/63* (2019.02); *B60L 58/10* (2019.02); *H02M 3/1586* (2021.05); *H02J 7/342* (2020.01); *H02J 2207/20* (2020.01)

(58) Field of Classification Search
None
See application file for complete search history.

(56) References Cited

U.S. PATENT DOCUMENTS

| 10,110,103 | B1 | 10/2018 | Hao et al. | |
| 2014/0021180 | A1* | 1/2014 | Vogel | H02M 7/4833 |
| | | | | 219/130.1 |
| 2018/0050604 | A1* | 2/2018 | Hare | B60L 53/11 |
| 2019/0165591 | A1* | 5/2019 | Kisacikoglu | B60L 53/20 |
| 2020/0177014 | A1* | 6/2020 | Lee | B60L 53/22 |
| 2020/0358359 | A1* | 11/2020 | Gagas | H02M 1/08 |

(Continued)

FOREIGN PATENT DOCUMENTS

WO   WO-2022145646 A1 *  7/2022  ............. B60L 53/20

OTHER PUBLICATIONS

Umichigan, Activity 5 Part (a): Time-Response Analysis of a Boost Converter Circuit, Published Jun. 16, 2015 (Year: 2015).*

*Primary Examiner* — Julian D Huffman
*Assistant Examiner* — John P Ondrasik
(74) *Attorney, Agent, or Firm* — Quinn IP Law

(57) ABSTRACT

A method for charging a battery pack via an offboard energy source uses an interleaved boost converter and closed-loop control. The energy source outputs a charging current via a DC charge port during a direct current fast-charging (DCFC) process. A controller detects a voltage disparity condition in which a voltage capability of the battery pack exceeds a voltage capability of the energy source. In response to this condition, a rise of the charging current over time is recorded as a current trajectory and an open-loop equivalent time constant is extracted from the current trajectory. A time constant of the PI control block is set substantially equal to the equivalent time constant. The PIM is controlled in closed-loop using proportional-integral control. The charging current is controlled in a continuous current conduction mode during the DCFC process.

20 Claims, 3 Drawing Sheets

(56) References Cited

U.S. PATENT DOCUMENTS

| | | | |
|---|---|---|---|
| 2021/0061113 A1* | 3/2021 | Ellis | H02J 7/0029 |
| 2023/0322204 A1* | 10/2023 | Telford | B60L 58/40 |
| | | | 701/22 |

* cited by examiner

US 12,500,437 B2

DC FAST CHARGING USING CLOSED-LOOP CONTROL OF MULTI-FUNCTIONAL INVERTER-BASED BOOST CONVERTER

INTRODUCTION

Rotary electric machines in the form of motor-generator units are used to generate torque or electricity in a host of electrified powertrain systems. For example, one or more electric propulsion motors may provide motor output torque to powered road wheels of a motor vehicle. Propulsion motors may also be used aboard other types of vehicles, e.g., boats or watercraft, aircraft, rail vehicles, etc., when powering a propulsor thereof. Likewise, electric motors may be used to provide work in a variety of non-vehicular systems, including but not limited to powerplants, hoists, conveyor systems, and the like.

When a motor is embodied as a polyphase/alternating current (AC) machine, the ON/OFF conducting states of multiple semiconductor power switches of a resident voltage inverter, referred to herein and in the art as a power inverter module (PIM), are individually controlled via pulse-width modulation (PWM), pulse-density modulation (PDM), or using another application-suitable switching control technique. The high-frequency switching control action ultimately converts a direct current (DC) input voltage from an onboard direct current (DC) power supply, e.g., an electrochemical battery pack, into an AC output voltage. The AC output voltage in turn is conducted to individual phase windings of the propulsion motor to cause machine rotation. The generated motor torque from such machine rotation is then directed to one or more of the road wheels during vehicle propulsion modes.

When electricity is generated at levels exceeding immediate or expected onboard energy requirements, the excess energy ("free energy") may be stored for later use in the constituent battery cells of the above-noted battery pack. Direct current fast-charging (DCFC) is one example of such a use. In a DCFC process, the propulsion battery pack is rapidly recharged using free energy offloaded from an available offboard DC energy source. While the offboard energy source is typically embodied as electric vehicle supply equipment (EVSE), in this case a DCFC-capable charging station, an alternative DCFC charging strategy exists in the form of vehicle-to-vehicle (V2V) charging. During V2V DCFC operations, free energy of a source vehicle, i.e., another motor vehicle or platform hosting the DC energy source, is offloaded to a depleted propulsion battery pack of the vehicle in need of charging. The source vehicle in this instance effectively performs DCFC functions of the EVSE charging station.

SUMMARY

Disclosed herein are an electric charging circuit and related closed-loop, proportional-integral (PI)-based control strategy for performing a direct current fast-charging (DCFC) operation of an electrochemical battery pack. In one or more embodiments as contemplated herein, the battery pack is a propulsion battery pack of a motor vehicle, e.g., a battery electric vehicle or a plug-in hybrid electric vehicle ("charging vehicle"). The charging circuit is hosted by/an integral part of the charging vehicle, with the charging vehicle and a resident electrified powertrain system thereof being characterized by an absence of a direct current-to-direct current (DC-DC) converter. Instead, an interleaved multi-functional inverter-based boost conversion process is performed via the charging circuit as set forth in detail hereinbelow with reference to the drawings.

In particular, the present solutions are intended to account for a voltage disparity condition in which a voltage capability of the propulsion battery pack of the charging vehicle exceeds a voltage capability of an offboard direct current (DC) energy source. For example, the propulsion battery pack of the charging vehicle may have a voltage capability of 500-800 volts (V) or more, while the DC energy source or another motor vehicle ("source vehicle") may provide a charging voltage of 300-400 V. The voltage disparity condition is therefore one in which a higher-voltage power supply is charged by a lower-voltage energy source during a DCFC process. The term "higher" and "lower", however, do not entail "high" or "low" in an absolute sense, but rather are used to describe relative voltage levels of the charging vehicle and the offboard energy source, and thus the present solutions may be extended to different voltage capabilities within the scope of the disclosure.

As appreciated in the art, a charging current supplied by an offboard energy source is ordinarily regulated by a controller of the offboard energy source. The charging vehicle sees a fixed charging voltage from the energy source during a DCFC event, i.e., a controller of the charging vehicle is unable to regulate the charging current provided by the offboard energy source. As a result, existing DCFC strategies and related circuit topologies for charging a higher-voltage battery pack from a lower-voltage energy source remain suboptimal. The alternative control strategy described in detail below is intended to address this issue within the context of DCFC operations. The present solutions also expand the range of available DCFC options and take better advantage of free energy from the existing population of lower-voltage "legacy" charging stations and battery electric vehicles, which is of particular benefit in view of the emergence of higher-voltage propulsion systems.

An aspect of the present disclosure includes a method for charging a battery pack of an electrified powertrain system via an offboard energy source. The offboard energy source is operable for outputting a charging current to the battery pack through an interleaved inverter-based boost converter during a DCFC process. An embodiment of the method includes detecting, via a controller of the electrified powertrain system, a voltage disparity condition in which a voltage capability of the battery pack exceeds a voltage capability of the offboard energy source. The method also includes, in response to the voltage disparity condition, recording a rise of the charging current over time as a current trajectory, and extracting an open-loop equivalent time constant from the current trajectory using the controller, and controlling a switching frequency and a duty cycle of the PIM of the interleaved inverter-based boost converter, in a closed-loop using a proportional-integral (PI) block of the controller, to thereby control the charging current in a continuous current conduction mode during the DCFC process. This includes setting a time constant of the PI control block to be substantially equal to the open-loop equivalent time constant.

The offboard energy source may include an EVSE charging station, in which case detecting the voltage disparity condition includes comparing a voltage capability of the battery pack to a voltage capability of the EVSE charging station.

The battery pack in one or more embodiments includes a first propulsion battery pack of a charging vehicle, the offboard energy source includes a source vehicle having a second propulsion battery pack, and the voltage capability of the second propulsion battery pack is less than about 75% of the voltage capability of the first propulsion battery pack.

Extracting an equivalent time constant may include determining a $1^{st}$ order time constant from an open-loop fixed duty cycle response of the interleaved inverter-based boost converter.

The method summarized above may optionally include initializing an integrator state of the PI control block based on initial voltage levels of the offboard energy source and the battery pack. One or more embodiments of the method include setting saturation limits of the PI control block based on an expected minimum voltage and an expected maximum voltage of the offboard energy source and the battery pack.

Another aspect of the disclosure includes, as part of the method, receiving a maximum ramp rate of the charging current command from the offboard energy source via the controller, determining a maximum ramp rate of the charging current command from the electrified powertrain system via the controller, and ramping the current command to a lower of the maximum ramp rate from the offboard energy source and the maximum ramp rate from the electrified powertrain system.

The method in one or more embodiments may include maintaining the continuous current conduction mode until predetermined conditions are met, the predetermined conditions being indicative of completion of the DCFC process.

Also disclosed herein is a charging circuit for performing a DCFC process of a battery pack of an electrified powertrain system using an offboard energy source. The charging circuit may include a DC charge port, an interleaved inverter-based boost converter, and a controller. The boost converter includes a power inverter module (PIM) having a plurality of power switches, a polyphase propulsion motor having a plurality of phase windings, and a set of input switches selectively connecting one or more of the phase windings to the offboard energy source via the DC charge port. The controller is configured to detect a voltage disparity condition in which a voltage capability of the battery pack exceeds a voltage capability of the offboard energy source. In response to the voltage disparity condition, the controller is configured to record a rise of the charging current over time as a current trajectory, extract an equivalent time constant from the current trajectory, and control a switching frequency and a duty cycle of the PIM in a closed-loop using a PI block to thereby control the charging current in a continuous current conduction mode during the DCFC process. The controller is configured to set a time constant of the PI control block to be substantially equal to the equivalent time constant during the continuous current conduction mode.

A motor vehicle as set forth herein includes a set of road wheels, a propulsion battery pack, a power inverter module (PIM) having a plurality of power switches, a polyphase propulsion motor connected to at least one of the road wheels, and having a plurality of phase windings, a DC charge port connected to the propulsion battery pack, an input switch disposed between the DC charge port and one of the phase windings of the polyphase propulsion motor, with the PIM, the polyphase propulsion motor, and the input switch forming an interleaved boost converter, and a controller as summarized above.

The above features and advantages, and other features and advantages, of the present teachings are readily apparent from the following detailed description of some of the best modes and other embodiments for carrying out the present teachings, as defined in the appended claims, when taken in connection with the accompanying drawings.

Figure 1:
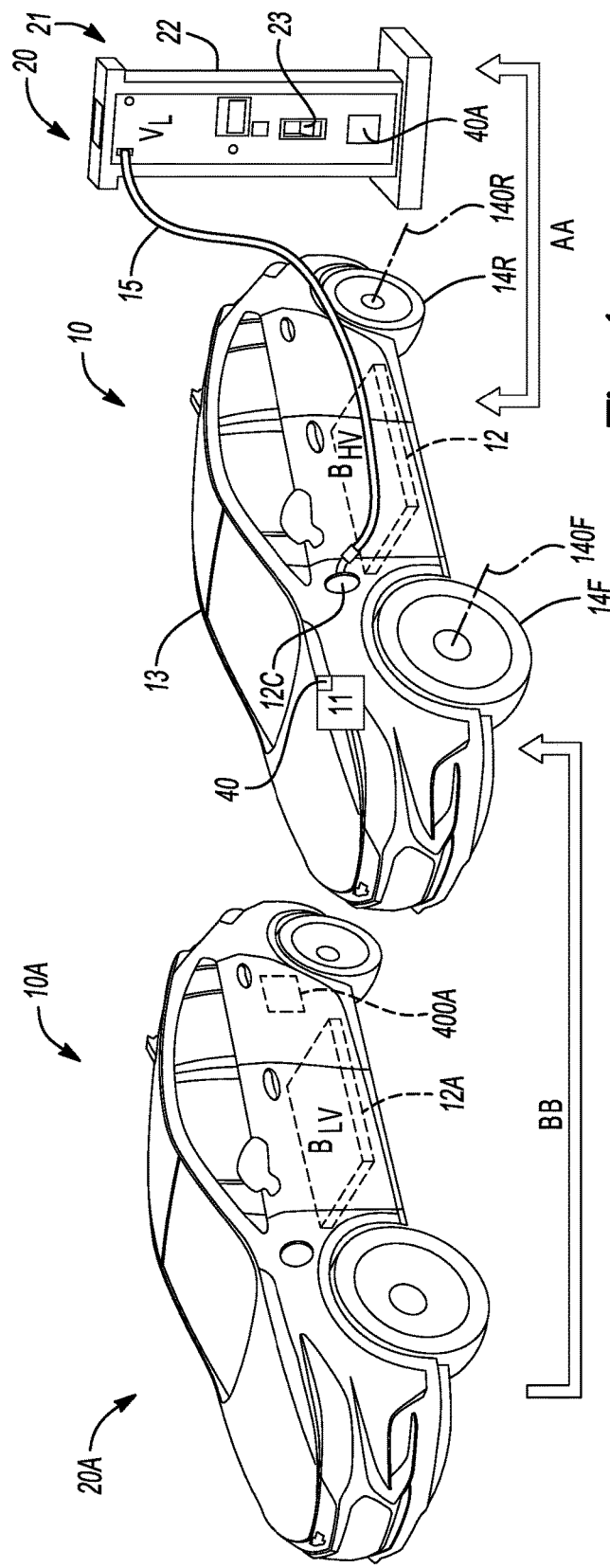
FIG. 1 illustrates a direct current fast-charging (DCFC) process in which a higher-voltage propulsion battery pack of a charging vehicle is charged using a lower-voltage offboard energy source in accordance with the present disclosure.

The present disclosure is amenable to various modifications and alternative forms, and some representative embodiments are shown by way of example in the drawings and will be described in detail herein. However, novel aspects of this disclosure are not limited to the particular forms illustrated in the above-enumerated drawings. Rather, the disclosure covers modifications, equivalents, combinations, groupings, and alternatives falling within the scope of the disclosure as encompassed, for example, by the appended claims. Additionally, the appended drawings are not necessarily to scale, and may present a simplified representation of various preferred features of the present disclosure as disclosed herein.

DETAILED DESCRIPTION

Referring to the drawings, wherein like reference numerals correspond to like or similar components throughout the several Figures, FIG. 1 illustrates two possible direct current fast-charging (DCFC) processes in accordance with the present disclosure. In a first charging scenario ("Charging Scenario I") represented by double-headed arrow AA, a motor vehicle 10 having a higher-voltage propulsion battery pack ($B_{HV}$) 12 is recharged during a DCFC process using offloaded free energy from an offboard, lower-voltage direct current (DC) energy source 20 in the form of a DCFC-capable electric vehicle supply equipment (EVSE) charging station 21. The charging station 21 outputs a charging voltage ($V_L$) that is lower than a voltage capability of the propulsion battery pack 12, with subscript "L" thus indicating a "lower" voltage level in a relative sense. In a second charging scenario ("Charging Scenario II") as represented by double-headed arrow BB, the higher-voltage battery pack 12 is instead charged using offloaded free energy from a lower-voltage battery pack ($B_{LV}$) 12A, e.g., of another motor vehicle 10A as shown or another mobile or stationary system. For clarity, motor vehicles 10 and 10A are referred to hereinafter as a charging vehicle 10 and a source vehicle 10A.

Figure 2:
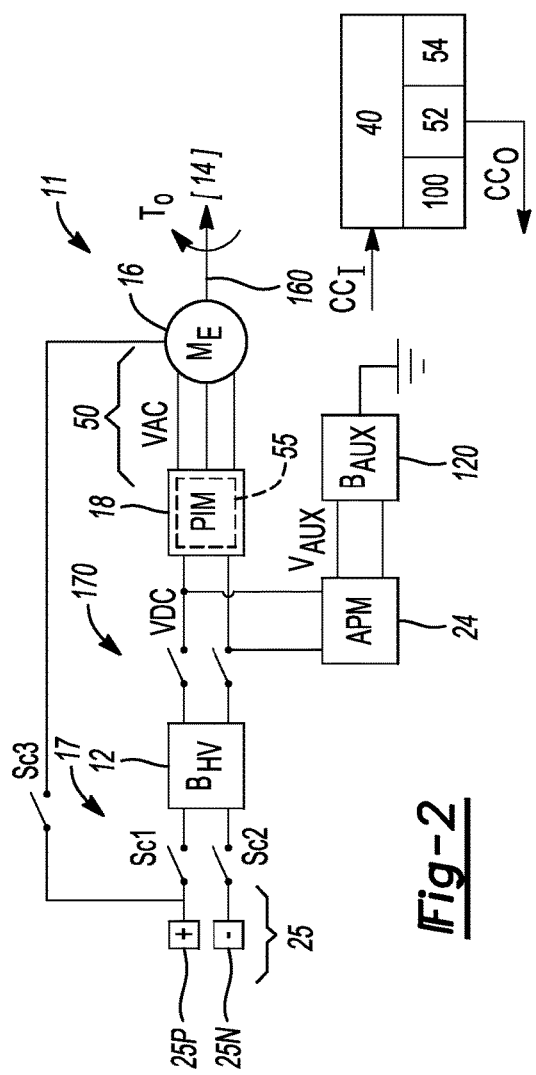
FIG. 2 is a simplified schematic illustration of a representative electrified powertrain system usable as part of the charging vehicle of FIG. 1.
Figure 3:
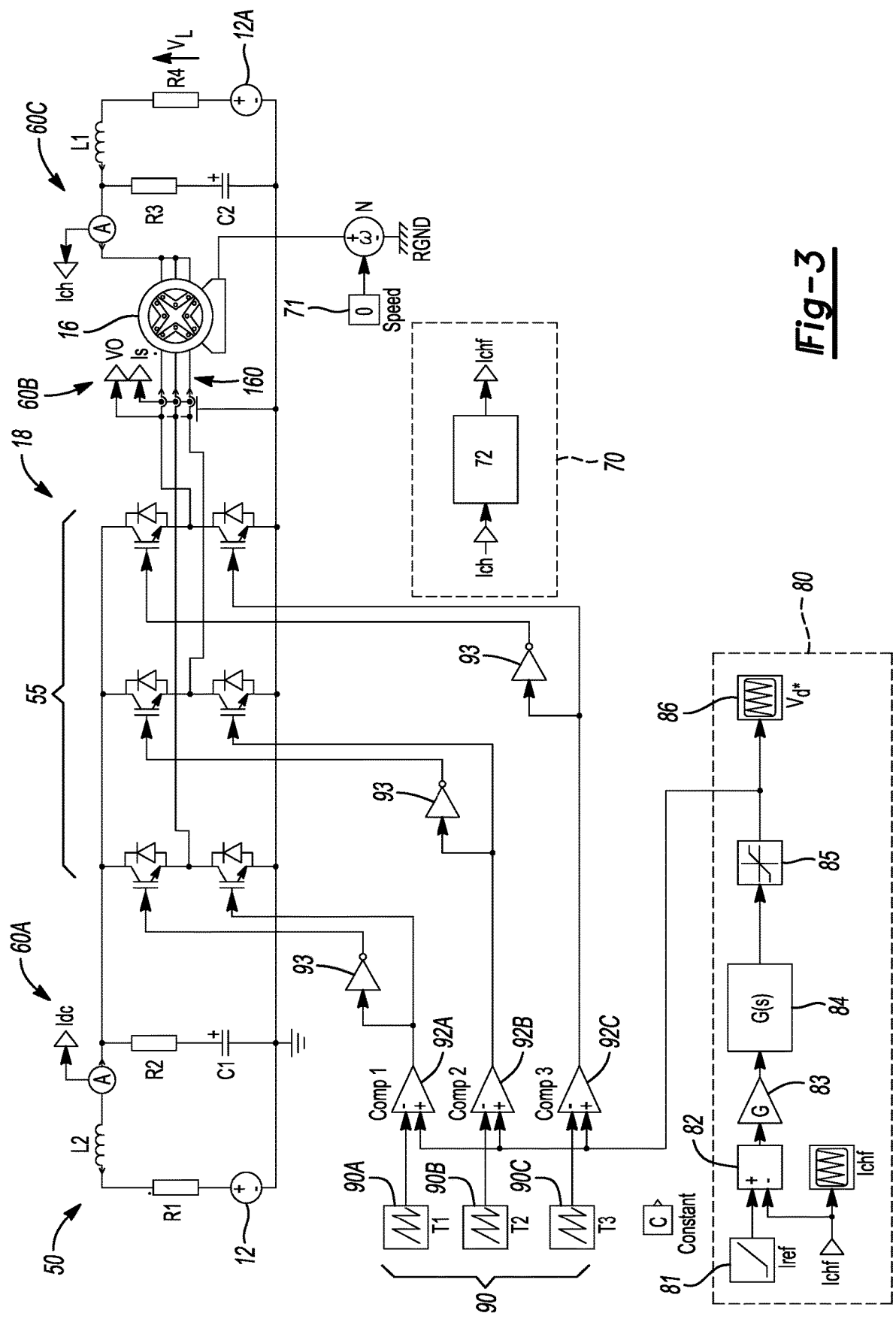
FIG. 3 is a circuit diagram for implementing a closed-loop control strategy aboard the charging vehicle of FIGS. 1 and 2 using an interleaved, multi-functional inverter-based boost conversion process when charging a higher-voltage propulsion battery pack of the motor vehicle using one of the lower-voltage energy sources shown in FIG. 1.

In Charging Scenario II, the charging vehicle 10A acts as a lower-voltage energy source 20A analogous to the lower-voltage energy source 20. DCFC operations performed in accordance with Charging Scenarios I and II are enabled herein by an interleaved, multi-functional inverter-based boost charging circuit 50 as shown in FIGS. 2 and 3. The exemplary charging circuit 50 in turn is controlled in accordance with closed-loop control theory, with an exemplary method 100 thereof being executable by a controller 40 of the charging vehicle 10 and described below with particular reference to FIG. 4.

An electrified powertrain system 11 of the charging vehicle 10 includes the propulsion battery pack 12. In the representative configuration of FIG. 1, the electrified powertrain system 11 is part of the charging vehicle 10, e.g., a battery electric vehicle as shown in FIG. 2, or a plug-in hybrid electric vehicle, etc. While the various examples described herein apply to vehicular operations, with the charging and source vehicles 10 and 10A being representative higher-voltage and lower-voltage systems, respectively, those skilled in the art will appreciate that DCFC may be used with a wide range of mobile and stationary systems. FIG. 1 is therefore representative of beneficial applications of the present teachings and non-limiting thereof.

The propulsion battery pack 12 may have a voltage capability of at least about 500 V in an exemplary embodiment. The term "higher-voltage" as used herein therefore encompasses a voltage range of about 500-800 V in one or more possible embodiments, with "lower-voltage" referring to maximum voltage capabilities of legacy DCFC stations and battery packs of older battery electric vehicles, e.g., typically 400 V or less. In other words, "lower-voltage" does not entail "low-voltage" in an absolute sense, but rather is used to differentiate between two different voltage levels representative of the voltage disparity condition considered herein.

The charging vehicle 10 shown in FIG. 1 may include front road wheels 14F and rear road wheels 14R rotatable about respective axes 140F, 140R, include a high-performance passenger vehicle, an electric delivery van, or a heavy-duty electric truck equipped with a native 800-900 V propulsion system. High-energy battery pack constructions having a lower nominal voltage capability of about 500-600 V are also contemplated for current or future use with certain mobile platforms. The 500-900 V nominal range noted above therefore applies to different higher-voltage constructions of the propulsion battery pack 12. For the foreseeable future, such propulsion battery packs 12 will continue to coexist with lower-voltage legacy charging infrastructure options and battery packs. Nominal 300-400 V embodiments of the lower-voltage energy sources 20 and 20A within the scope of the disclosure are therefore represented hereinbelow by the charging station 21 and the source vehicle 10A, respectively.

In Charging Scenario I as summarized above, an operator of the charging vehicle 10 connects a charging port 12C arranged on a body 13 of the charging vehicle 10 to the charging station 21. The charging station 21 typically includes a weatherproof charging cabinet 22 containing therein (or in remote communication with) a controller 40A and charging hardware (not shown) suitable for providing a charging voltage over an electrical cable 15. A DC charge coupler (not shown) disposed on an end of the electrical cable 15 connects to mating receptacles of the charging port 12C. When the DCFC process is complete, the operator disconnects the DC charge coupler, closes a cover of the charging port 12C, and sets the DC charge coupler into a holster or cradle 23 of the charging cabinet 22 for later use.

Charging Scenario II may be conducted in a similar manner, albeit with the source vehicle 10A replacing the charging station 21 as the provider of lower-voltage energy, in this instance from the propulsion battery pack 12A. Charging Scenarios I and II are regulated in accordance with prevailing charging standards, including two-way communication between the controller 40A of the charging station 21 or a controller 400A of the source vehicle 10A, on one hand, and an onboard controller 40 of the charging vehicle 10.

Referring to FIG. 2, the electrified powertrain system 11 is schematically depicted in accordance with an embodiment of the present disclosure in which the charging vehicle 10 of FIG. 1 is constructed as a battery electric vehicle. During a DCFC event performed in accordance with Charging Scenario I or II as set forth above, the propulsion battery pack 12 is connected to one of the lower-voltage energy sources 20 or 20A, such that a charging voltage is provided from one of the lower-voltage energy sources 20 or 20A, e.g., at or below 400 V as noted above. This charge transfer occurs via a positive link (+) 25P and a negative link (−) 25N of a DC charge receptacle 25 and a first set of input switches 17, with the input switches 17 shown as representative switches Sc1, Sc2, and Sc3. The DC charge receptacle 25 is electrically connected to the DC charge port 12C of FIG. 1, such that a charging voltage supplied to the charging vehicle 10 through the charge port 12C is supplied to the positive and negative links 25P and 25N, respectively.

An input switch Sc3 of the first set of input switches 17 is closed to connect the lower-voltage energy source 20 or 20A to an electric propulsion motor (ME) 16 as set forth below with reference to FIG. 3. Main contactors 170 may be opened/closed to disconnect/connect the propulsion battery pack 12 to a power inverter, i.e., a power inverter module (PIM) 18 as shown. Pulse width modulation (PWM) or another suitable switching control technique may be used to control individual ON/OFF conductive states of sets of semiconductor power switches 55 within the PIM 18 as appreciated in the art, and to thereby output an AC voltage (VAC) suitable for powering the electric propulsion motor 16. During normal propulsion modes, the DC fast charge switches, i.e., input switches Sc1, Sc2, Sc3, are left open and the main contactors 170 are closed to power the PIM 18 to energize the electric propulsion motor 16. The energized electric propulsion motor 16 ultimately generates and delivers motor output torque (arrow $T_O$) to a rotatable output member 160, which in turn is coupled to a load, in this instance one or more of the front and/or rear road wheels 14F, 14R of the charging vehicle 10 shown in FIG. 1, as indicated in FIG. 2 at [14].

Although the electrified powertrain system 11 of FIG. 2 is shown in simplified manner for illustrative simplicity and clarity, additional electrical components are included to power multiple electrical components and systems aboard the charging vehicle 10. For example, the propulsion battery pack 12 may be connected to an accessory power module (APM) 24 in the form of a DC-DC converter suitable for reducing a level of a DC voltage (VDC) of the propulsion battery pack 12, e.g., 500-900 V, to a typical 12-15 V auxiliary voltage level. An auxiliary battery ($B_{AUX}$) 120 such as a lead-acid auxiliary battery may be connected to the APM 24, with internal switching operation of the APM 24 ensuring that the auxiliary battery 120 remains properly charged via an auxiliary voltage ($V_{AUX}$), or that one or more low-voltage systems aboard the charging vehicle 10, e.g., a radio, lighting, display screen, etc., are provided with power sufficient for energizing their respective functions.

Within the representative electrified powertrain system 11 shown in FIG. 2, the controller 40 aboard the charging vehicle 10 receives input signals (arrow $CC_I$) from the various components and, in response to execution of the method 100, outputs a set of control signals (arrow $CC_O$). While the control signals (arrow $CC_O$) may extend beyond the scope of the present disclosure, at least some of the control signals (arrow $CC_O$) are used herein to implement closed-loop control over the multi-functional inverter-based boost charging circuit 50. To that end, a processor 52 of the controller 40 is configured to execute an algorithm or algorithms, control logic, or computer-readable instructions from memory 54 when performing the method 100. Such instructions may be stored, for example, in main or auxiliary or remote memory of a tangible computer-readable medium, e.g., magnetic or optical media, CD-ROM, and/or solid-state/semiconductor memory (e.g., various types of RAM or ROM). Execution of the instructions/method 100 by the processor 52 causes the controller 40 to regulate operation of the charging circuit 50, an example of which is shown in FIG. 3.

The term "controller" and related terms such as control module, module, control, control unit, processor, and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory components are capable of storing machine-readable instructions in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example 50-100 microsecond (ms) intervals during ongoing operation. Alternatively, routines may be executed in response to occurrence of a triggering event.

Communication between the controllers 40, 40A, and 400A of FIG. 1 or other possible controllers, actuators, and/or sensors may be accomplished using a direct-wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog signals, or digitized analog signals representing inputs from sensors, actuator commands, and communication between controllers.

As shown in FIG. 2, the present closed-loop control strategy utilizes the propulsion motor 16 and internal power switches 55 of the PIM 18 as an interleaved converter for the purpose of increasing or boosting the charging voltage ($V_L$) during a DCFC event, particularly one in which the charging voltage ($V_L$) is less than the voltage capability of the propulsion battery pack 12 as noted above. The charging circuit 50 is characterized by an absence of a dedicated DC-DC boost converter as part of the electrified powertrain system 11, with the charging circuit 50 instead using phase windings of the propulsion motor 16 and ON/OFF state control of the power switches 55 of the PIM 18 to selectively increase the level of the supplied charging voltage ($V_L$).

As part of the method 100, the controller 40 regulates the switching frequency and a voltage duty cycle of the power switches 55 to minimize losses while providing the desired boosted voltage to the propulsion battery pack 12. In addition to this control strategy, the present disclosure adds closed-loop control of a supplied voltage/current to avoid overload and potential damage to the propulsion battery pack 12, the propulsion motor 16, the PIM 18, and related components during a DCFC process.

Referring now to FIG. 3, the charging circuit 50 noted above is shown in further detail according to a representative embodiment. A challenge associated with performing a DCFC event accordance with Charging Scenarios I and II as set forth above is that charging current regulation is typically performed by the external charging source, e.g., the charging station 21 of FIG. 1. However, such a scheme may be unsuitable in the context of the voltage disparity condition of the present disclosure. That is, a controllable current source is not ordinarily made available to the charging vehicle 10 and its resident controller 40. The charging vehicle 10 and controller 40, in other words, see the lower-voltage energy sources 20 or 20A of FIG. 1 as a fixed external voltage source. The present solutions add closed-loop control of the charging current from the lower-voltage energy sources 20 or 20A via the charging circuit 50 to achieve a controllable charging current as set forth below.

The charging circuit 50 of FIG. 3 includes the propulsion motor 16 and the PIM 18. The power switches 55 of the PIM 18 may be constructed from application-suitable semiconductor devices such as insulated gate bipolar transistors (IGBTs) as shown, or as metal oxide semiconductor field-effect transistors (MOSFET), thyristors, or another electronic switching device having controllable conducting modes (ON) and blocking modes (OFF) set by the controller 40. The propulsion battery pack 12 as modeled includes a resistance and inductance, respectively represented as resistor R1 and inductor L2. Additionally, the charging circuit 50 includes a DC link capacitor C1 and its equivalent series resistor (R2).

The PIM 18 is connected to the propulsion battery pack 12, together in parallel with the resistor R2 and DC link capacitor C1, with the DC link capacitor C1. The constituent power switches 55 of the PIM 18 in turn are connected to at least some phase windings 160 of the propulsion motor 16 as shown in FIG. 3 and appreciated in the art. During a DCFC event performed in accordance with Charging Scenarios I or II, i.e., via the lower-voltage energy source 20 or 20A of FIG. 1, respectively, the propulsion battery pack 12A (or the charging station 21) provide the lower voltage ($V_L$) to the charging circuit 50 through at least one of the phase windings 160. The switching circuit 50 is thus properly modeled to account for the inductance and resistance between the charging port 12C (see FIG. 1) and the lower-voltage energy source 20 or 20A, with a series resistor R4 and an inductor L1 representing the impedance of the battery pack 12A/lower-voltage energy source 20 or 20A. A filter capacitor C2 with internal series equivalent resistance R3 is included to reduce the ripple current drawn from the external source, e.g., propulsion battery pack 12A.

In addition, the charging circuit 50 as depicted in FIG. 3 includes multiple-parameter sensing circuits 60A, 60B, and 60C. The sensing circuit 60A located proximate the propulsion battery pack 12A is operable for measuring a current delivered to the propulsion battery pack 12, with the measured current at this location represented herein as Idc, in amps (A). The sensing circuit 60B proximate the propulsion motor 16 is operable for measuring an initial voltage (VO) and a steady-state current (Is) present on the phase windings 160 of the propulsion motor 16. The sensing circuit 60C for its part is operable for measuring a charging current provided via the DC charge receptacle 25 (see FIG. 2) by the lower-voltage source 20 or 20A, with this value reported to the controller 40 as a charging current (Ich).

Closed-loop control of the charging current (Ich) after being fed into the charging port 12C of FIG. 1 is facilitated by a filter circuit 70. The charging current (Ich) measured by the sensing circuit 60C, with the propulsion motor 16 held at a zero angular speed (w) as indicated by a zero speed input at 71, may be processed through a signal filter 72, e.g., a low-pass filter, with the filtered output value (Ichf) being used by the controller 40 as a feedback term within the closed-loop control strategy described herein.

Additionally, the charging circuit 50 of FIG. 3 includes a duty cycle circuit 80. The duty cycle circuit 80 is used either at the onset of the method 100 or offline to determine parameters for use in controlling the power switches 55 of the PIM 18. The charging circuit 50 as contemplated herein is highly non-linear. The present approach therefore reduces the non-linear system to a $1^{st}$ order system using the duty cycle circuit 80, with the controller 40 ultimately determining an equivalent time constant ($\tau$) from a trajectory of the charging current from the lower-voltage energy source 20 or 20A as set forth below with reference to FIG. 4 for use within a proportional-integral (PI) control block 84. In the present context, the derived time constant ($\tau$) is directly related to the open-loop time constant (C) of the combined machine-inverter, i.e., the propulsion motor 16 and the PIM 18.

Within the duty cycle circuit 80, the controller 40 of FIG. 2 outputs a current command as a reference current, i.e., (Iref) shown at block 81. The reference current (Iref) is fed along with the feedback term (Ichf) from the filter circuit 70 into a node 82 at which the feedback term (Ichf) is subtracted from the reference current (Iref). The difference or error value is multiplied by a predetermined gain value at a corresponding gain block (G) 83, with a gain of ten being exemplary.

The gain-increased error value is fed into the PI control block 84, which is represented herein as a $1^{st}$ order transfer function G(s), the output of which may be further processed through maximum and minimum limits of a saturation block 85 to provide a duty cycle voltage (Vd*) as an output, as shown at block 86. As appreciated in the art, the duty cycle (Vd*) determined in this way is a unitless value describing the ratio of a pulse width to a single period (T) of an exemplary PWM switching input.

The $1^{st}$ order transfer function G(s) used at block 84 may have parameters set as follows:

Initial value of integrator:

$$d0 = 1 - \frac{V_{dc1}}{V_{dc}},$$

Maximum limit of integrator:

$$d\_max = 1 - \frac{V_{dc1\_min}}{V_{dc\_max}},$$

Minimum limit of integrator:

$$d\_min = 1 - \frac{V_{dc1\_max}}{V_{dc\_min}},$$

and

PI-time constant≈open-loop equivalent time constant ($\tau$) With respect to the latter term, the controller 40 ultimately sets a time constant of a PI control block 84 to be substantially equal to the equivalent time constant (T). The gain at block 83 is selected to achieve closed-loop bandwidth to follow a maximum desired ramp rate to a maximum charging current, e.g., 0 to $I_{max}$ in 10 ms. Thus, the closed-loop bandwidth is selected by the controller 40 herein to achieve stable control for a ramped current command, Iref.

Still referring to FIG. 3, the charging circuit 50 for each of the phases of the propulsion motor 16 uses an input stage 90 to control an ON/OFF state of each respective one of the power switches 55 of the PIM 18. To perform this function, a respective comparator 92A, 92B, or 92C, i.e., Comp1, Comp2, or Comp3, receives two inputs: (i) a sawtooth reference waveform 90A, 90B, or 90C of a fixed amplitude and a controllable frequency, and (ii) the duty cycle (Vd*) from block 80. When the DC level of the duty cycle (Vd*) exceeds the reference from input stage 90, the lower switches of the power switches 55 turn on/conduct and, due to the NOT gate 93, the upper switches turn off. During the time the lower switches of the PIM 18 are turned off, the upper switches may be turned on.

The respective periods T1, T2, and T3 of three sawtooth reference waveforms 90A, 90B, and 90C are phase-shifted by one third of a period relative to each other. For instance, for a 10 KHz representative embodiment of the reference waveform 90A, i.e., T1=100 ms, the reference waveform 90B is phase-shifted by 33.3 ms with respect to reference waveform 90A, and the reference waveform 90C is phase-shifted by 66.7 ms with respect to the reference waveform 90A. The illustrated implementation thus controls three phases of a representative three-phase embodiment of the propulsion motor 16 where the input source, in this case the battery pack 12A, is connected to the neutral terminal of the 3-phase machine, i.e., the electric propulsion motor 16.

Fewer than the total number of available phases could be controlled to reduce losses in some embodiments. For instance, in a typical three-phase embodiment of the electric propulsion motor 16, control of just two of the three available phases would require two of the comparators 92A, 92B, or 92C and two of the corresponding sawtooth reference waveforms 90A, 90B, or 90C, shifted in this exemplary instance of T=100 ms by T/2, i.e., 50 ms. However, the benefit of controlling all three phases in interleaved or non-interleaved fashion is the prevention of undesirable rotation of the propulsion motor 16 during the DCFC process. In the exemplary case of a 3-wire/2-phase or 4-wire/2-phase interleaved mode of boost converter operation, the equivalent time constant may be determined at different rotor positions of the propulsion motor 16 and thereafter stored in a lookup table in memory 54. The stopped rotor position during V2V charging may be determined prior to initiating the DCFC process, with the gain (G) from block 83 and the time constant selected according to the lookup table for an open-loop equivalent time constant.

The outputs of the comparators 92A, 92B, and 92C are thereafter passed to lower/negative and upper/positive switches of the power switches 55 for each respective phase, with a NOT gate 93 interposed between the comparators 92A, 92B, 92C and the corresponding upper/positive members of the power switches 55 as shown. Use of the NOT gates 93 in this manner ensures that the logical ON/OFF conducting state of the various power switches 55 remains opposite for the upper/positive relative to the lower/negative switches and vice versa, as appreciated in the art.

Figure 4:
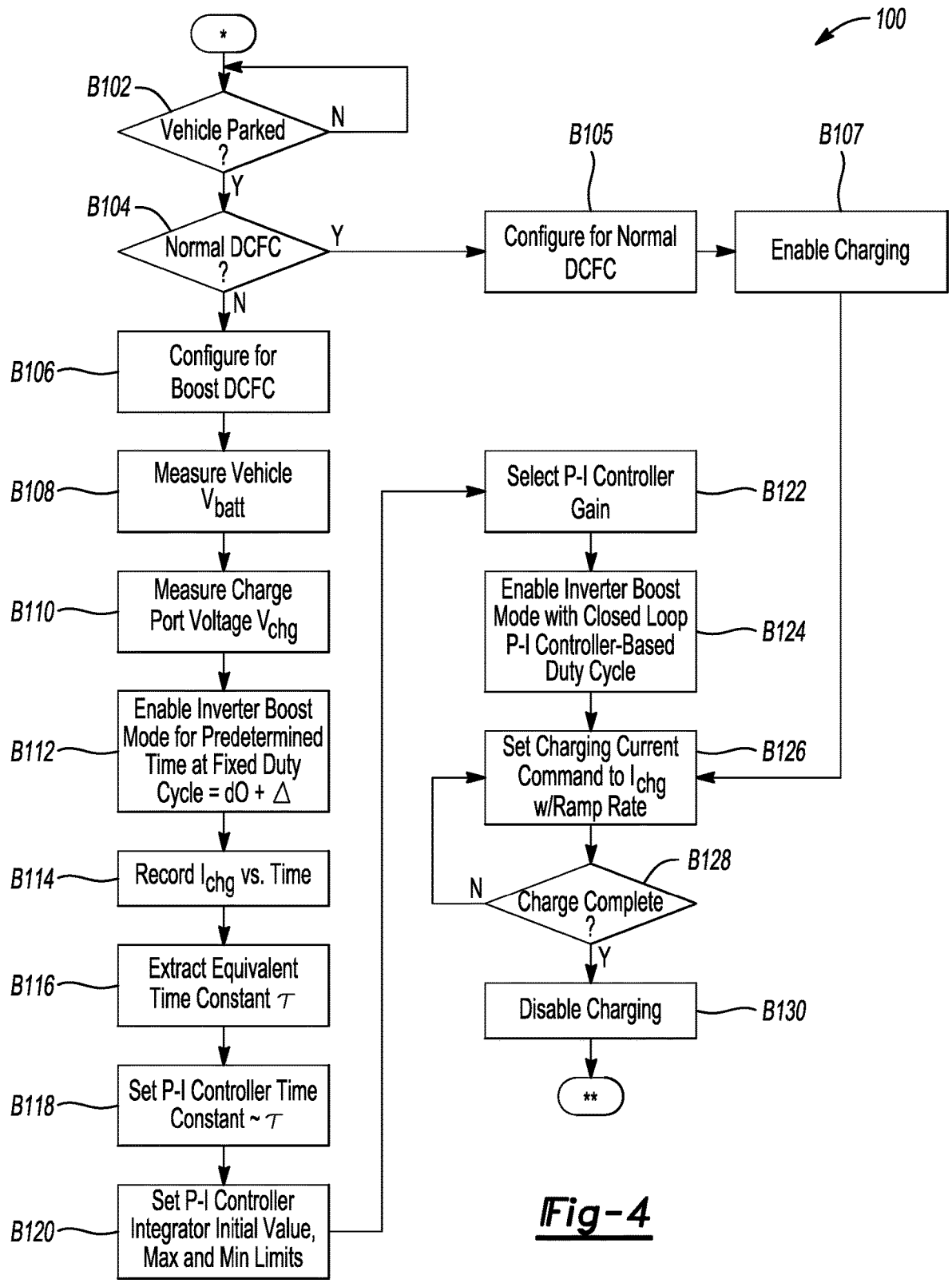
FIG. 4 is a flow chart describing an embodiment of a method for controlling the charging circuit shown in FIG. 3.

Turning now to FIG. 4, an embodiment of the method 100 is executable by the controller 40 of FIGS. 1 and 2, using the representative charging circuit 50 of FIG. 3, to perform a DCFC process in which the propulsion battery pack 12 of the charging vehicle 10 depicted in FIG. 1 is recharged using one of the lower-voltage energy sources 20 or 20A. The method 100 may be used by the controller 40 to enact closed-loop control over a current command, e.g., 0 to 150 A, as such current is fed into the propulsion battery pack 12. Throughout the method 100, various parameters are monitored in real-time by the involved controllers to ensure such parameters remain within calibrated threshold performance limits, e.g., controllers 40 and 400A or controllers 40 and 40A depending on the scenario.

Beginning with logic block B102 after initialization (*) of the controller 40, with "block" referring herein to a specific algorithm step, code segment, or subroutine within the content of the method 100, the controller 40 of FIGS. 1 and 2 at block B102 determines whether the charging vehicle 10 shown in FIG. 1 is currently parked and stationary. Block B102 may entail verifying a park, reverse, neutral, drive, low (PRNDL) setting of the charging vehicle 10, for instance, to confirm that the charging vehicle 10 is in a "park" state such that the electrified powertrain system 11 of FIG. 2 is not actively generating torque for propelling the charging vehicle 10. The method 100 proceeds to block B104 when the charging vehicle 10 is in park, with the controller 40 otherwise repeating block B102.

At block B104, the controller 40 next determines whether a normal DCFC event has been initiated or requested. Within the context of method 100, "normal" refers to a DCFC event in which the available charging voltage equals or exceed the voltage capability of the propulsion battery pack 12 aboard the charging vehicle 10. As appreciated in the art, the connection of a DC charge coupler of the representative charging station 21 of FIG. 1, or of a charging cable (not shown) extending between the source vehicle 10A and the charging vehicle 10 during a V2V DCFC event, is accompanied by an exchange of pilot and proximity information between the controllers 40 and 40A (or 40 and 400A).

As part of this exchange, which occurs in compliance with a predetermined charging protocol as understood in the art, the controller 40 is made aware of the available charging voltage. Thus, block B104 is a matter of comparing the available charging voltage from the lower-voltage energy source 20 or 20A to the voltage capability of the propulsion battery pack 12. The method 100 proceeds to block B105 when a normal DCFC event has been requested, and to block B106 in the alternative.

Block B105 entails configuring the charging vehicle 10 for the normal DCFC charging process detected at block B104, e.g., by opening the switch Sc3 of FIG. 2 and closing the main contactors 170 and switches Sc1 and Sc2. The method 100 then proceeds to block B107.

Block B106 includes configuring the charging circuit 50 of FIG. 3 to perform the onboard inverter-based boosting operation described above. That is, when the controller 40 finishes detecting a voltage disparity condition in which a voltage capability of the propulsion battery pack 12 exceeds a voltage capability of the lower-voltage offboard energy source 20 or 20A, the controller 40 performs block B106 in response to the voltage disparity condition. An illustrative example of such a voltage disparity condition, for instance, a voltage capability of the propulsion battery pack 12A of FIG. 1 (a second propulsion battery pack) being less than about 75% of the voltage capability of the propulsion battery pack 12 (i.e., a first propulsion battery pack in this example).

Block B106 may include leaving switch Sc1 open, and closing the switches Sc2 and Sc3 and the main contactors 170 of FIG. 2 via commands from the controller 40. The method 100 thereafter proceeds to block B108.

At block B107 ("Enable Charging"), the controller 40 of the charging vehicle 10 enables DCFC operations and commences charging of the propulsion battery pack 12 per block B126 before proceeding to block B128.

Block B108 includes measuring or otherwise determining the voltage capability/battery voltage of the propulsion battery pack 12, e.g., using a pack-level voltage sensor (not shown) or a plurality of cell-level voltage sensors. The measured battery voltage is then saved to memory 54 of the controller 40. The method 100 proceeds to block B110 once the battery voltage of the propulsion battery pack 12 has been determined.

At block B110, the controller 40 next measures or otherwise determines the charging voltage provided to the charging port 12C of FIG. 1/DC charge receptacle 25 of FIG. 2. Block B112 may be measured at or proximate the DC charge coupler (not shown), for instance, or reported by the controller 40 or 400A as part of the ongoing DCFC process. The method 100 proceeds to block B112 after ascertaining the charging voltage.

At block B112 of the method 100, the controller 40 enables an inverter boost mode for a predetermined duration at a fixed duty cycle of d0+Δ. Here, the value of Δ is small, e.g., 5% or less, or just enough to cause the charging current to begin to flow into the charging circuit 50. The method 100 then proceed to block B114.

Block B114 involves recording a time response of the charge port-side, i.e., the charging current (Ichg). The time response is seen as a rising trajectory of the charging current (Ichg) from an initial value of zero to a predetermined steady-state value. The method 100 proceeds to block B116 after recording the time response, i.e., Ichg vs. time.

Block B116 includes extracting, via the controller 40, the equivalent time constant (T) of the charge port-side of the current response in block B114. That is, the method 100 includes recording a rise of the charging current (Ichg) over time as a current trajectory, with the (open-loop) equivalent time constant (τ) being extracted, i.e., calculated or otherwise determined, from the current trajectory. As appreciated in the art, the equivalent time constant (τ) is equal to time elapsed for the charging current (Ichg) to rise from zero to about 63% of the steady-state current (Is). The method 100 proceeds to block B118 after extracting the equivalent time constant (T) of the charge port-side/supply side of the charging circuit 50.

At block B118, the controller 40 sets a time constant of the PI control block 84 (FIG. 3), i.e., of a transfer function G(s) thereof as appreciated in the art, to be substantially equal to the value of the equivalent time constant (T) determined in block B116. The method 100 thereafter proceeds to block B120.

Block B120 of the method 100 shown in FIG. 4 includes setting the initial value and max/min saturation limits of the PI control block 84 (FIG. 3), i.e., initializing an integrator state of the PI control block 84 based on initial voltage levels of the offboard energy source 20, 20A and the propulsion battery pack 12 of the charging vehicle 10.

Setting the saturation limits of the PI control block 84 may be based on an expected minimum voltage and an expected maximum voltage of the offboard energy source 20, 20A and the battery pack 12 in one or more embodiments. That is, the controller 40 may initialize an integrator state of the PI control block 84 based on the initial voltages of the lower-voltage energy source 20 or 20A and the higher-voltage propulsion battery pack 12. The saturation limits are thus based on the expected minimum and maximum voltages of the various energy storage devices involved in the DCFC process. The method 100 thereafter proceeds to block B122.

Block B122 entails selecting the gain (G) at block 83 of FIG. 3 for use with the PI control block 84. As noted above, the gain within the context of the method 100 may be selected to achieve closed-loop bandwidth to follow a maximum desired ramp rate, e.g., 0 to Imax in 10 ms or over another application-suitable ramp rate. The method 100 then proceeds to block B124.

At block B124, the controller 40 next enables an inverter boost mode with closed-loop PI controller-based control over duty cycle. That is, in block B124, the duty cycle Vd* of block 86 (FIG. 3) is applied via the PI control block 84 as described above. The controller 40 thereafter maintains a continuous current conduction mode, i.e., providing the steady-state current (Is) as the charging current, with the method 100 thereafter proceeding to block B126.

At block B126, the controller 40 sets the charging command to the charging current (Ichg) with the associated ramp rate. The charging current (Ichg), or more precisely a current command from the controller 40 causing the same, is thus ramped for the source-side, i.e., lower-voltage energy source 20 or 20A, up to max/min limits of block B120 as set by the energy source 20, 20A or the controller 40, whichever limit is lower. That is, the controller 40 may determine a maximum ramp rate of the charging current command (Ichg) from the electrified powertrain system 11, thereafter ramping the current command (Ichg) to a lower of a maximum ramp rate from the offboard energy source 20 or 20A, i.e., from the controller 40A or 400A, and a maximum ramp rate from or specified by the controller 40 of the electrified powertrain system 11. Thus, normal DCFC mode of operation can use the charge current command setting without going through inverter boost mode. The method 100 then proceeds to block B128.

Block B128 of FIG. 4 entails determining, via the controller 40, whether the DCFC event initiated at block B107 is complete. That is, the controller 40 is configured to maintain the continuous current conduction mode until predetermined conditions indicative of completion of the DCFC process are satisfied. For example, block B128 could include comparing a state of charge (SOC) limit of the propulsion battery pack 12 to a predetermined SOC, e.g., 80% SOC or another SOC level as requested by the controller 40. Other conditions could be used in addition to or instead of SOC within the scope of the disclosure, e.g., charging time, pack voltage, etc. The method 100 proceeds to block B130 when the DCFC event is complete, with the method 100 otherwise proceeding or looping back to block B126.

Block B130 includes disabling charging of the battery pack 12 via the controller 40. That is, energy is no longer offloaded to the battery pack 12 from one of the lower-voltage energy sources 20 or 20A of FIG. 1. The current command responsible for generating the charging current (Ichg) is then ramped down to zero. Block B130 is followed by an operator's removal of the DC charge coupler from the charging port 13 of FIG. 1. The method 100 is complete (""") upon completion of block B130**.

The method 100 and charging circuit 50 described above provide several features and advantages. For example, the disclosed solutions enable charging of a higher-voltage energy storage system using a lower-voltage energy storage system using a multi-functional inverter strategy, without requiring a DC-DC boost converter, and with the switching frequency of the PIM 18 of FIG. 2 being selected above a predetermined value for a continuous current condition mode of operation. The present approach also measures various currents and provides a DC input to the power switches 55 of the PIM 18 as noted above via block 80.

Additionally, the controller 40 determines an equivalent $1^{st}$-order time constant of a charge port-side/supply-side response using an open-loop fixed duty cycle boost mode response as set forth above. Thereafter, the charging circuit 50 employs a closed-loop current control scheme using block 80 of FIG. 3, in particular the PI control block 84, with the time constant thereof being based on the open-loop time constant of the motor-inverter based converter of the charging circuit 50.

As will be appreciated by those skilled in the art in view of the foregoing disclosure, it may be possible in some implementations to calculate an amount of power or energy drawn from the lower-voltage energy source 20 or 20A over a duration of the DCFC process during which the boost charging sequence of method 100 is active. For instance, after quantifying the energy offloaded from the energy source 20 or 20A, a user of the charging vehicle, i.e., the charging vehicle 10 of FIG. 1, may be charged a suitable amount of money for the service by the owner or operator of the lower-voltage energy source 20 or 20A. Thus, the provision of DCFC services from legacy charging stations or lower-voltage battery electric vehicles may be monetized, which in turn could facilitate growth of a larger fleet of what could be deemed mobile DCFC charging stations. These and other attendant benefits will be readily appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for charging a battery pack of an electrified powertrain system via an offboard energy source, the offboard energy source being operable for outputting a charging current to the battery pack through an interleaved inverter-based boost converter during a direct current fast-charging (DCFC) process, the method comprising:

detecting, via a controller of the electrified powertrain system, a voltage disparity condition in which a first voltage capability of the battery pack exceeds a second voltage capability of the offboard energy source;

in response to the voltage disparity condition, enabling an open-loop boost mode of the interleaved inverter-based boost converter for a predetermined time at a fixed duty cycle;

recording, during the predetermined time in which the open-loop boost mode is enabled, a rise of the charging current over time as a current trajectory;

extracting an open-loop equivalent time constant from the current trajectory using the controller; and controlling a switching frequency and a duty cycle of a power inverter module (PIM) of the interleaved inverter-based boost converter, in a closed-loop boost mode using a proportional-integral (PI) block of the controller, to thereby control the charging current in a continuous current conduction mode during the DCFC process, including setting a time constant of the PI control block to be equal to the open-loop equivalent time constant.

2. The method of claim 1, wherein the offboard energy source includes an electric vehicle supply equipment (EVSE) charging station, and wherein detecting the voltage disparity condition includes comparing the first voltage capability of the battery pack to the second voltage capability of the EVSE charging station.

3. The method of claim 1, wherein the battery pack is a first propulsion battery pack of a charging vehicle, wherein the offboard energy source includes a source vehicle having a second propulsion battery pack, and wherein the second voltage capability of the second propulsion battery pack is less than 75% of the first voltage capability of the first propulsion battery pack.

4. The method of claim 1, wherein extracting the open-loop equivalent time constant includes determining a $1^{st}$ order time constant from a response of the interleaved inverter-based boost converter operating in the open-loop boost mode during the fixed duty cycle.

5. The method of claim 1, further comprising: initializing an integrator state of the PI control block based on initial voltage levels of the offboard energy source and the battery pack.

6. The method of claim 1, further comprising: setting saturation limits of the PI control block based on an expected minimum voltage and an expected maximum voltage of the offboard energy source and the battery pack.

7. The method of claim 1, further comprising:
receiving a first maximum ramp rate of the charging current from the offboard energy source via the controller;
determining a second maximum ramp rate of the charging current from the electrified powertrain system via the controller; and
ramping the charging current to a lower of the first maximum ramp rate from the offboard energy source and the second maximum ramp rate from the electrified powertrain system.

8. The method of claim 1, further comprising: maintaining the continuous current conduction mode until predetermined conditions are met, the predetermined conditions being indicative of completion of the DCFC process.

9. A charging circuit for performing a direct current fast-charging (DCFC) process of a battery pack of an electrified powertrain system using an offboard energy source, comprising:
a direct current (DC) charge port;
an interleaved inverter-based boost converter, comprising:
a power inverter module (PIM) having a plurality of power switches;
a polyphase propulsion motor having a plurality of phase windings; and
a set of input switches selectively connecting one or more of the phase windings to the offboard energy source via the DC charge port; and
a controller configured to detect a voltage disparity condition in which a first voltage capability of the battery pack exceeds a second voltage capability of the offboard energy source, and in response to the voltage disparity condition, to:
enable an open-loop boost mode of the interleaved inverter-based boost converter for a predetermined time at a fixed duty cycle;
record, during the predetermined time in which the open-loop boost mode is enabled, a rise of the charging current over time as a current trajectory;
extract an equivalent time constant from the current trajectory; and
control a switching frequency and a duty cycle of the PIM in a closed-loop boost mode using a proportional-integral (PI) block of the controller to thereby control the charging current in a continuous current conduction mode during the DCFC process, wherein the controller is configured to set a time constant of the PI control block to be equal to the equivalent time constant during the continuous current conduction mode.

10. The charging circuit of claim 9, wherein the offboard energy source includes an electric vehicle supply equipment (EVSE) charging station, and wherein the controller is configured to detect the voltage disparity condition by comparing the first voltage capability of the battery pack to the second voltage capability of the EVSE charging station.

11. The charging circuit of claim 9, wherein the battery pack is a first propulsion battery pack of a battery electric vehicle, wherein the offboard energy source includes another battery electric vehicle having a second propulsion battery pack, and wherein the second voltage capability of the second propulsion battery pack is less than 75% of the first voltage capability of the first propulsion battery pack.

12. The charging circuit of claim 9, wherein the controller is configured to extract the equivalent time constant at least in part by determining a $1^{st}$ order time constant from a response of the interleaved inverter-based boost converter operating in the open-loop boost mode during the fixed duty cycle.

13. The charging circuit of claim 9, wherein the controller is configured to initialize an integrator state of the PI control block based on initial voltage levels of the offboard energy source and the battery pack.

14. The charging circuit of claim 9, wherein the controller is configured to set saturation limits of the PI control block based on an expected minimum voltage and an expected maximum voltage of the offboard energy source and the battery pack.

15. The charging circuit of claim 9, wherein the controller is configured to receive a first maximum ramp rate of the charging current from the offboard energy source, determine a second maximum ramp rate of the charging current from the electrified powertrain system, and ramp the charging current to a lower of the first maximum ramp rate from the offboard energy source and the second maximum ramp rate from the electrified powertrain system.

16. The charging circuit of claim 9, wherein the controller is configured to maintain the continuous current conduction mode until predetermined conditions indicative of completion of the DCFC process are satisfied.

17. A motor vehicle comprising:
a set of road wheels;
a propulsion battery pack;
a power inverter module (PIM) having a plurality of power switches;
a polyphase propulsion motor connected to at least one of the road wheels, and having a plurality of phase windings;
a direct current (DC) charge port connected to the propulsion battery pack;
an input switch disposed between the DC charge port and one of the phase windings of the polyphase propulsion motor, wherein the PIM, the polyphase propulsion motor, and the input switch form an interleaved boost converter; and a controller configured to detect a voltage disparity condition in which a first voltage capability of the propulsion battery pack exceeds a second voltage capability of an offboard energy source, and in response to the voltage disparity condition, to:
  enable an open-loop boost mode of the interleaved boost converter for a predetermined time at a fixed duty cycle;
  record, during the predetermined time in which the open-loop boost mode is enabled, a rise of the charging current over time as a current trajectory;
  extract an equivalent time constant from the current trajectory; and
  control a switching frequency and a duty cycle of the PIM in a closed-loop boost mode using a proportional-integral (PI) block of the controller to thereby control the charging current in a continuous current conduction mode during a direct current fast-charging (DCFC) process of the propulsion battery back, wherein the controller is configured to set a time constant of the PI control block to be equal to the equivalent time constant during the continuous current conduction mode.

18. The motor vehicle of claim 17, wherein the equivalent time constant is equal to time elapsed for the charging current to rise from zero to a predetermined steady-state current value.

19. The motor vehicle of claim 17, wherein the motor vehicle is a first battery electric vehicle (BEV) and the offboard energy source is a second propulsion battery pack of a second BEV, and wherein the second voltage capability of the second propulsion battery pack is 50% to 80% of the first voltage capability of the propulsion battery pack of the first BEV.

20. The motor vehicle of claim 19, wherein the first voltage capability of the propulsion battery pack of the first BEV is at least 500 V, and wherein the second voltage capability of the second propulsion battery pack of the second BEV is less than 400 V.

\* \* \* \* \*